United States Patent
Bader (10) Patent No.: US 7,881,196 B2
(45) Date of Patent: Feb. 1, 2011

(54) RESOURCE RESERVATION IN A PACKET SWITCHED TELECOMMUNICATIONS NETWORK

(75) Inventor: Attila Bader, Fot (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 621 days.

(21) Appl. No.: 10/596,615

(22) PCT Filed: Dec. 19, 2003

(86) PCT No.: PCT/SE03/02037

§ 371 (c)(1),
(2), (4) Date: Jun. 19, 2006

(87) PCT Pub. No.: WO2005/060189

PCT Pub. Date: Jun. 30, 2005

(65) Prior Publication Data

US 2007/0115843 A1    May 24, 2007

(51) Int. Cl.
*H04L 12/26* (2006.01)
(52) U.S. Cl. ...................................................... 370/234
(58) Field of Classification Search ...... 370/229–230.1, 370/231, 234–235, 252, 389
See application file for complete search history.

(56) References Cited

U.S. PATENT DOCUMENTS

| | | | | |
|---|---|---|---|---|
| 6,707,790 | B1 * | 3/2004 | Wu et al. ..................... | 370/230 |
| 7,113,791 | B2 * | 9/2006 | Lepschy et al. .......... | 455/452.2 |
| 2001/0027490 | A1 | 10/2001 | Fodor et al. | |
| 2001/0054103 | A1 * | 12/2001 | Chen .......................... | 709/226 |
| 2002/0034166 | A1 * | 3/2002 | Barany et al. ............... | 370/329 |
| 2002/0160785 | A1 * | 10/2002 | Ovesjo et al. ............... | 455/453 |
| 2003/0133443 | A1 * | 7/2003 | Klinker et al. .............. | 370/353 |
| 2003/0227871 | A1 * | 12/2003 | Hsu et al. ................... | 370/230 |
| 2004/0184477 | A1 * | 9/2004 | Tavli et al. .................. | 370/461 |

FOREIGN PATENT DOCUMENTS

| | | | |
|---|---|---|---|
| EP | 1211851 A1 | 6/2002 | |
| WO | WO 00/62572 | * | 10/2000 |
| WO | WO 03077588 A1 | 9/2003 | |

OTHER PUBLICATIONS

Szabolcs Malomsoky, Sandor Racz, Szilveszter Nadas, "Connection admission control in UMTS radio access networks", (2003), Computer Communications 26, pp. 2011-2023. Dec. 16, 2001.*

Mannder, J. et al. Analysis of Existing Quality of Service Signaling Protocols. Internet Enginerring Task Force. Feb. 2003.

Malomsoky, Szabolcs, et al. Connection Admission Control in UMTS Radio Access Networks. Computer Communications 26 (2003) 2011-2023. Dec. 16, 2001.

* cited by examiner

*Primary Examiner*—Derrick W Ferris
*Assistant Examiner*—Omar Ghowrwal (57) ABSTRACT

Resource reservation in a packed switched telecommunications network is provided. System and method are directed to make resource reservation especially in an Internet Protocol (IP) network for achieving Quality of Service (QoS) requirements controlling traffic preferable in a Terrestrial Radio Access Network (UTRAN) of a Universal Mobile Telecommunications Network (UMTS). A sub-object of source statistics description characterizes the statistical behavior of a traffic source for example the average length of ON and OFF periods. The sub-object is used to reserve resources in a per-flow reservation method or for calculation of the number of resource units in edge nodes in case of an aggregated reservation method.

13 Claims, 6 Drawing Sheets

RESOURCE RESERVATION IN A PACKET SWITCHED TELECOMMUNICATIONS NETWORK

BACKGROUND OF THE INVENTION

1. Technical Field of the Invention

The invention relates to resource reservation in a packed switched telecommunications network. In particular, and not by way of limitation, the present invention is directed to a system and method for making efficient resource reservation in an Internet Protocol (IP) network for achieving strict Quality of Service (QoS) requirements controlling traffic in a Universal Mobile Telecommunications Network (UMTS) Terrestrial Radio Access Network (UTRAN).

2. Description of Related Art

UTRAN is the Radio Access Network of $3^{rd}$ rd generation mobile networks. Efficient bandwidth utilization is an essential problem in UMTS access networks because radio links or narrow leased lines are used in this part of the network. In UTRAN different traffic types having different QoS requirements are delivered in the same time and in the same link. UTRAN is characterized by strict delay requirements and short buffers. In order to meet the strict QoS requirements advanced traffic control methods have to be used. Traffic control usually includes packet scheduling, classification and call admission control (CAC).

Transport technology of UTRAN is based on currently on Asynchronous Transport Method (ATM) and Internet Protocol (IP) as it is described in 3GPP TS 25.401, 3GPP, TSG RAN: UTRAN overall description. As a general tendency, earlier versions of UTRAN are based on ATM while new versions will be based on IP technology. The major motivation to introduce IP technology in UTRAN is that IP allows more flexible fault handling and auto-configuration functions. Besides, it is expected to be a cheaper technology because of the wide deployment of IP routers.

The traffic parameters have to be signaled to UTRAN nodes when a new call is set up. The signaled parameters should be conformed to standard traffic control solutions. The control plane for AAL2/ATM transport network in UTRAN is specified in Q.2630.2 ITU-T recommendation (12/2000): "AAL Type 2 signaling protocol (Capability Set 2)". The control plane for IP based transport network is under specification in 3GPP.

For ATM based UTRAN an accurate CAC algorithm was developed that calculates the required bandwidth for the configuration of the number of active calls belonging to different traffic classes and for the new call in a link. The CAC algorithm is described in Sz. Malomsoky, S. Racz and Sz. Nadas, "Connection Admission Control in UMTS Radio Access Networks," Computer Communications, Special Issue on 3G Wireless and Beyond for Comp. Communication, June 2002. It takes into account the activity of the calls and also exploits the periodicity of the traffic at the so-called Iub or Iur interface.

In IP based UTRAN, in order to achieve QoS, different QoS models and provisioning methods are considered such as Integrated Services (IntServ), Differentiated Services (Diffserv), different measurement based methods or over provisioning. These methods have different signaling requirements, which are analyzed in Manner, J. and X. Fu, "Analysis of Existing Quality of Service Signaling Protocols", draft-ietf-nsis-signalling-analysis-01.txt, February 2003 in more detail.

In IP networks RSVP is the most common resource reservation signaling protocol which is published by R. Braden et. al.: Resource ReSerVation Protocol (RSVP)—Version 1 Functional Specification, RFC 2205, September 1997.

In Next Steps in Signaling (NSIS) working group Internet Engineering Task Force (IETF) a new signaling protocol for providing QoS in IP network is under development. The protocol will be based on RSVP and it will support different QoS models. NSIS protocol aims to meet the requirements of mobile networks and it may be used for transport network control plane in UTRAN in the future.

Figure 1:
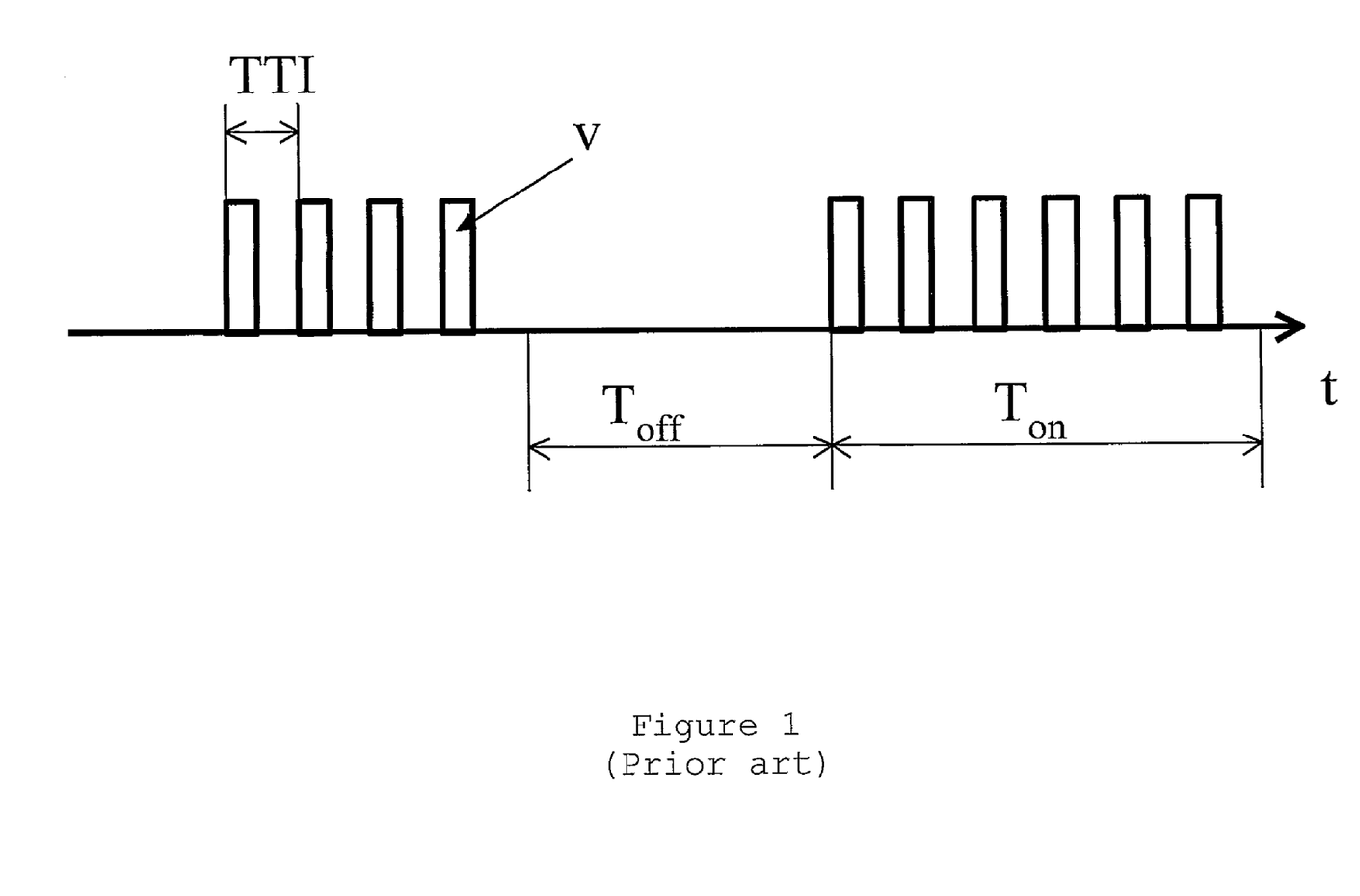
FIG. 1 shows time diagram of a periodic ON-OFF like model according to the prior art.

FIG. 1 shows packet arrival of a periodic ON-OFF like traffic model, where the time is denoted by t, packet size by v, transmission time interval by TTI, time of ON periods by $T_{on}$ and time of OFF periods by $T_{off}$. $T_{on}$ and $T_{off}$ define a so-called activity factor measured by $A=T_{on}/(T_{off}+T_{on})$. In UTRAN the traffic through the Iub or Iur interface can be characterized by a periodic ON-OFF like model as it is described in 3GPP TS 25.401, 3GPP, TSG RAN: UTRAN overall description. The CAC method described in this document checks two different criteria: whether there is congestion due to ON-OFF like behavior and, in a smaller time scale, the probability of the delay violation of the packets are below the required limit. In a link where different traffic types are multiplexed, the delay of packets depends significantly on the queuing and scheduling method used in the system. Priority for the traffic classes having strict delay requirements are applied.

Investigations showed that the delay violation probability monotonously increases with the length of the ON periods, by fixing the activity factor value. Furthermore, considering typical UTRAN delay requirement and transmission time interval TTI values, the delay violation probability only little depends on the length of the ON and OFF periods.

Therefore, as a worst case scenario, infinite ON and OFF periods are assumed in the model and application level call activity is taken into account by using average activity factors characterizing the different connection types.

Figure 2:
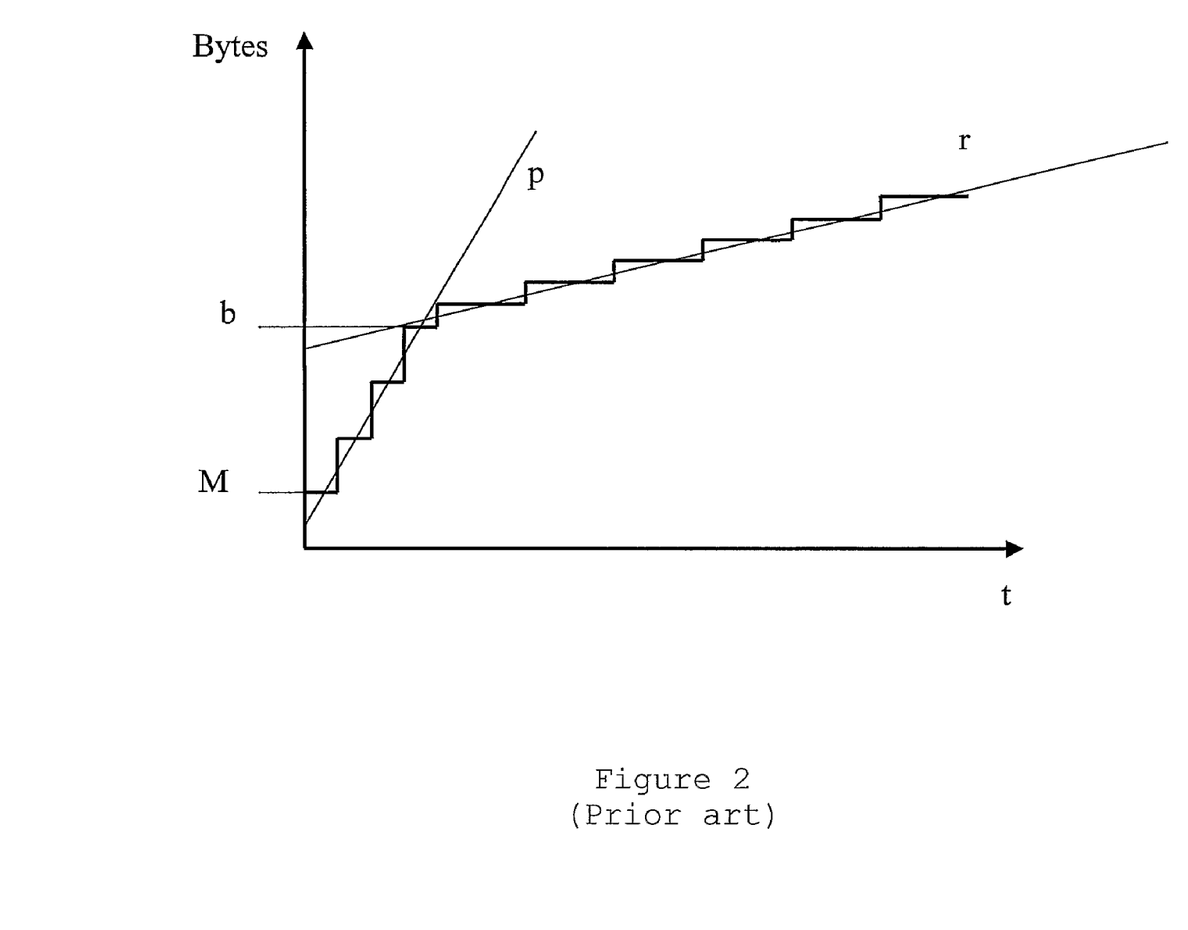
FIG. 2 depicts the time diagram of a token bucket traffic model relating to the prior art too.

FIG. 2 depicts another model called token bucket model, which is used to describe and shape bursty traffic of Internet applications presented by J. Wroclawski: "The Use of RSVP with IETF Integrated Services, RFC 2210, September 1997". A token bucket allows peak rate p for a limited time period, determined by the bucket size b, after which traffic rate cannot exceed the token rate r. The maximum packet size is denoted by M in the figure.

The traffic envelope in these cases is an upper bound of the user traffic. If user traffic is shaped by e. g. a leaky bucket algorithm the traffic envelope is a curve as it shown in FIG. 2. If the traffic is a periodic traffic, the traffic envelope is as it is shown in FIG. 1.

Future NSIS protocol will support standard IP based QoS models like IntServ and DiffServ. IntServ is based on a one-token bucket model. Token bucket traffic descriptors cannot be converted one-by-one to the traffic descriptors of a periodic ON-OFF like traffic model described above.

A one-token bucket model is not suitable to describe periodic ON-OFF like traffic in efficient way. In a one-token bucket model the bucket size should be set to the packet size, the token rate should be set to at least v/TTI, peak rate to v/D in order to conform Iub or Iur traffic where v denotes the packed size, TTI is the time period and D stands for the delay criterion. In this way neither activity of a call (ON-OFF like behaviour) nor the periodic behaviour of Iub or Iur traffic can be taken into account easily in a resource reservation function. This results in that over-dimensioning and over-provisioning is needed and, therefore, link utilization is less efficient.

If infinite ON and OFF periods do not provide a good approximation for a traffic type, the long-time behavior of the traffic sources cannot be characterized by a single activity factor parameter. In this case a more detailed traffic descriptor is needed.

In general, there is no standard solution yet how to describe a periodic ON-OFF like traffic in an IP based resource reservation signaling protocol.

Thus there is a particular need for a new QoS service object proposed for resource reservation signaling protocols that can be used for making efficient resource reservation for a periodic ON-OFF like traffic in a packed switched, especially in an IP based network.

SUMMARY OF THE INVENTION

The present invention enables that an object contains the traffic envelope, QoS descriptors and a source description characterizing the statistical behaviour of a traffic source. The source statistics description can be used to characterize the average length of ON and OFF periods. The object can be used to reserve resources in a per-flow reservation method or for calculation of the number of resource units in edge nodes in case of an aggregated reservation method.

Accordingly, the invention is directed to a method for resource reservation meeting the QoS requirement of a packet switched telecommunications network.

In another aspect, the present invention is directed to a system in which the resource reservation of an ON-OFF like traffic is implemented.

In yet another aspect, the present invention is directed to an object including source statistics description describing the statistical behavior of a source.

In a further aspect, the present invention is directed to a node in a packet switched telecommunications network furnished with computing means for interpreting resource reservation objects including sub-object of source statistics description.

The most important advantage of the invention is that using the QoS object the statistical behaviour of a source can be signalled to another network node and it can be taken into account in the reservation method. Therefore more efficient and accurate resource reservation can be made in IP routers. For example in case of a periodic ON-OFF like traffic (traffic through Iub or Iur interface of UTRAN) the flow activity can be exploited and the periodicity of the traffic can also be taken into account in the resource reservation algorithm. Both features result in more efficient link utilization.

It is also advantageous that the QoS object is defined in general way: it can be used either in a future resource reservation protocol or in another resource reservation protocol in which individual QoS models can be defined.

Another advantage is that the invention can be used in a per flow reservation method to perform accurate traffic control in each node. It can be used also for an aggregated reservation method in the edge nodes to calculate the required resources to be reserved in the domain. In both case more efficient link utilization can be achieved.

BRIEF DESCRIPTION OF THE DRAWINGS

For a more complete understanding of the invention, reference is made to the following detailed description taken in conjunction with the accompanying drawings wherein.

DETAILED DESCRIPTION OF THE INVENTION

In the present invention, the QoS object supporting an efficient resource reservation method is similar to the future QoS object describing the IntServ model: It contains a traffic envelope for the traffic bunches, description of the required QoS descriptors. In addition to this, the QoS object according to the invention includes a new sub-object that characterizes the statistics of the source.

Therefore, the QoS object includes at least three sub-objects:

(1) The descriptors of the desired QoS including maximum delay of a packet, delay violation probability, maximum packet loss ratio, etc.

(2) Packet level traffic parameters characterizing the traffic envelope. This can be a token bucket traffic parameter set as in case of IntServ. Or for a simple periodic traffic flow including packet size v and peak rate p.

(3) Description of the source statistics: distribution types and parameters of the distributions. For example for an Iub or Iur traffic it can be the length of the ON and OFF periods:

(a) The distribution type of the length of the ON periods: e.g. Exponential= 1

(b) The parameters of the length of the ON periods: m, mean time of ON periods (c) The distribution type of the length of the OFF periods: e.g. Exponential= 1

(d) The parameters of the length of the OFF periods: n, mean time of OFF periods The activity factor A can be obtained as $m/(n+m)$. The definition of the source traffic statistics sub-object is more general than it is needed for model described in the prior art, therefore it can be used to characterize other traffic sources as well, by specifying the parameters and its distribution characterizing the source.

Figure 3:
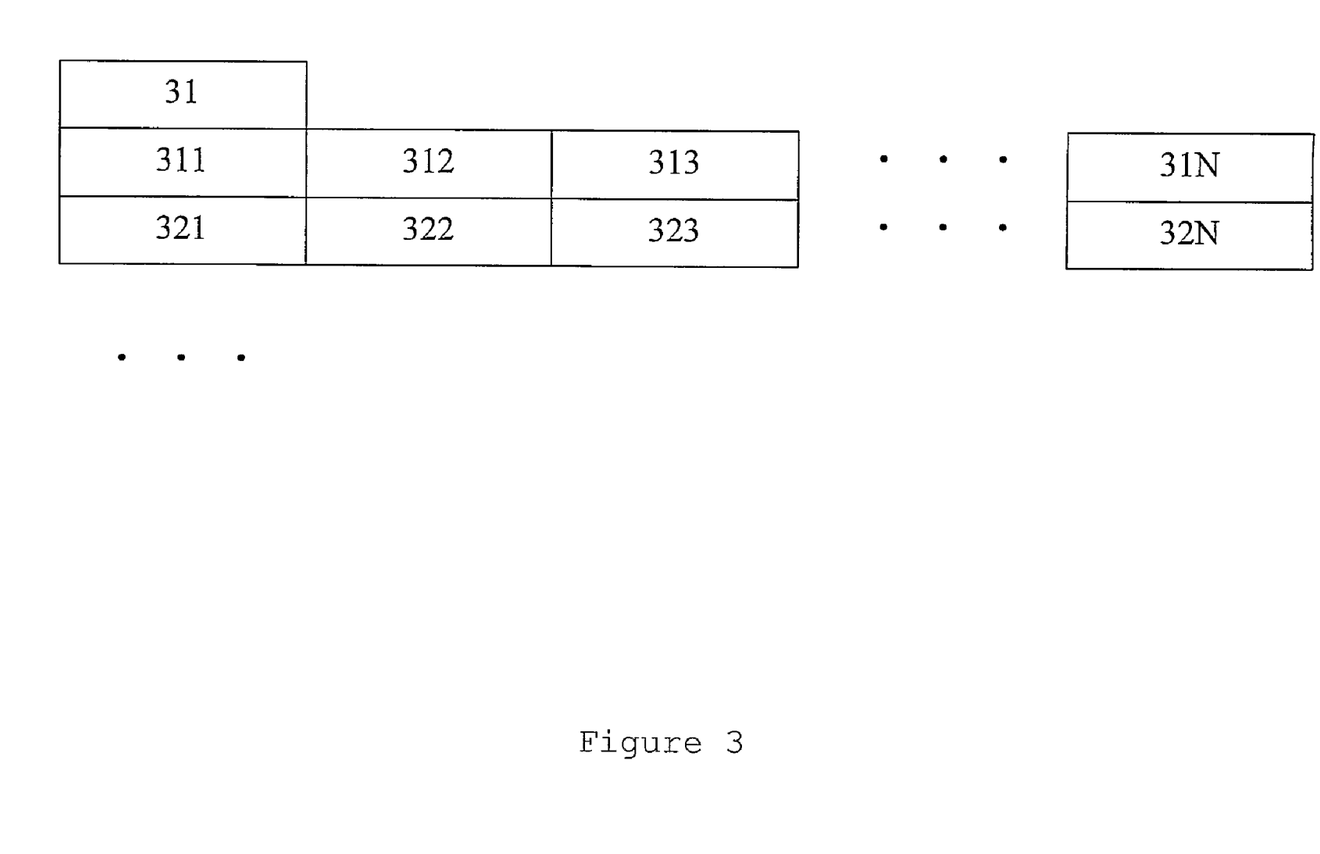
FIG. 3 illustrates the chart of the general form of the source statistics sub-object.

FIG. 3 illustrates the chart of the general form of the source statistics sub-object. The source statistics sub-object includes fields of data bits coding source type field 31, field of type for the first distribution 311, field of first parameter for the distribution 312 and further fields of parameters for the distribution if any 313 . . . 31N; then field of type for the second distribution 321, field of first parameter for the distribution 322 and further fields of parameters for the distribution if any 323 . . . 32N, and so on.

The source statistics sub-object can be used either to make reservation for a traffic flow in case of a 'per flow' reservation method, or for calculation of number of resource units in an aggregated reservation method.

Figure 4:
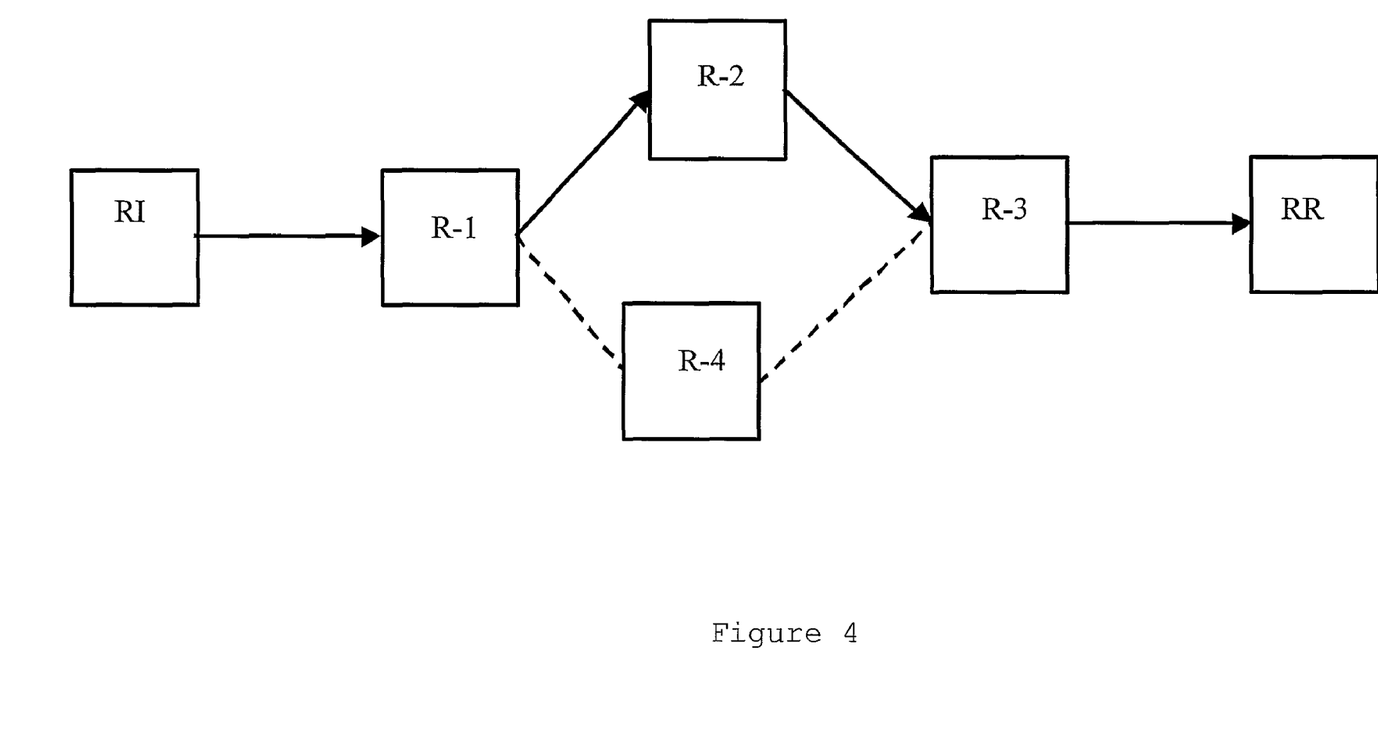
FIG. 4 is a simplified block diagram illustrating resource reservation is a per flow method.

FIG. 4 is a simplified block diagram illustrating the first method, that is, resource reservation in a per flow method. Setting up a new flow in the network, a reservation initiator RI sends a RESERVE message towards reservation receiver RR including QoS object for each flow. Practically, a reservation initiator RI can be a base station controller (BSC) and reservation receiver RR can be a radio network controller (RNC), or vice versa, RI can be an RNC and RR is a BSC. In each node where reservation has to be done an algorithm mentioned in 3GPP TS 25.401, 3GPP, TSG RAN: UTRAN overall description or a similar algorithm calculates the needed resources and makes reservation for the new flow. Such nodes can be implemented as IP routers having computing means for switching flow of transmissions and are linked together by transmission channels. In the figure routers R-1, R-2 and R-3 participate in resource reservation for the new flow, while router R-4 does not. So the RESERVE message is sent along reservation initiator RI-routers R-1-R-2-R-3—reservation receiver RR. If reservation is successful the connection can be established. If it is unsuccessful an error message is sent and processed and so the new flow is not allowed to enter the network.

Figure 5:
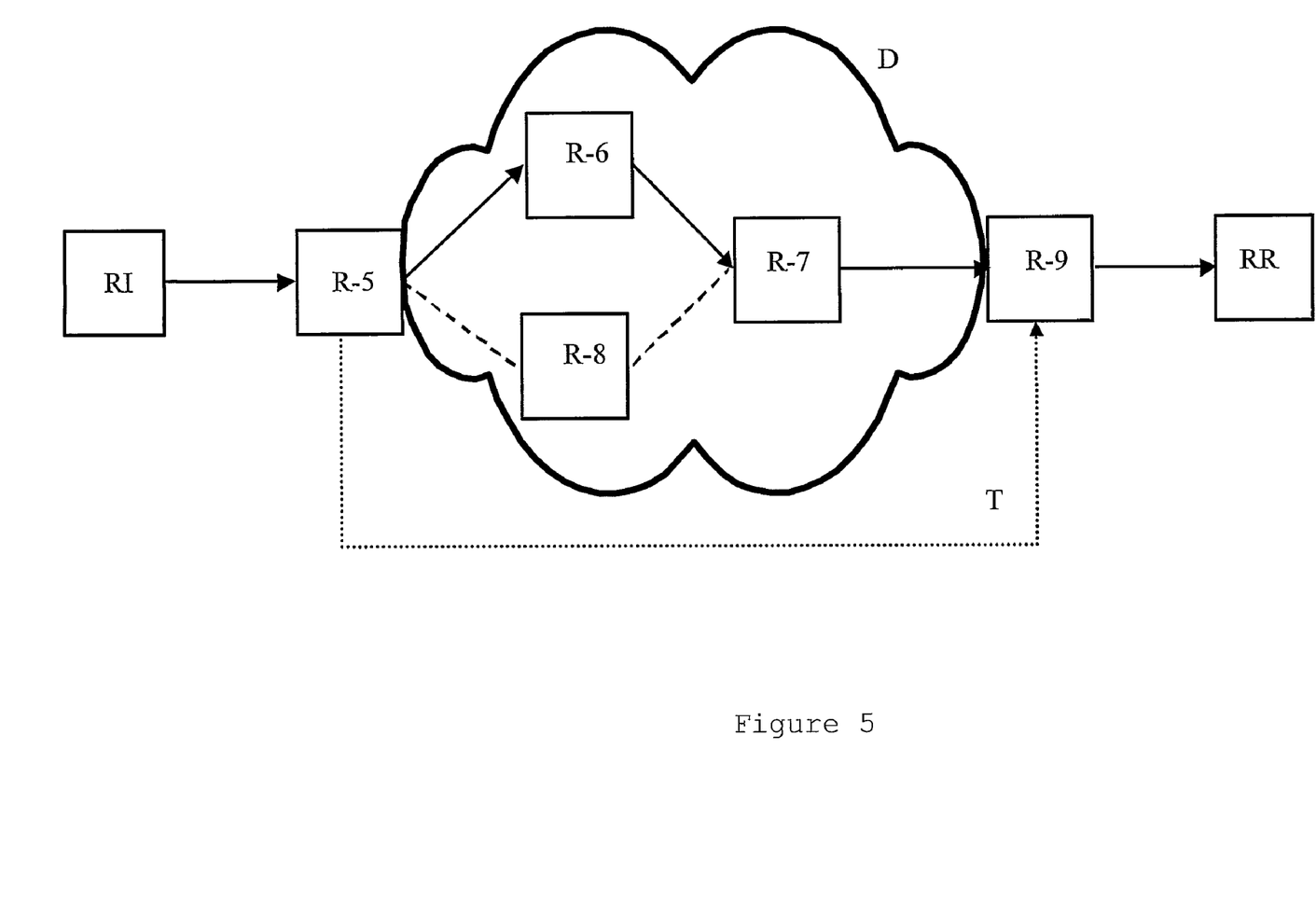
FIG. 5 shows a simplified block diagram depicting resource reservation in an aggregation domain.

FIG. 5 shows a simplified block diagram depicting resource reservation in an aggregation domain. In the second method, shown in this figure, resource initiator RI sends a RESERVE message to resource receiver RR including QoS object. An algorithm described in Sz. Malomsoky, S. Racz and Sz. Nadas, "Connection Admission Control in UMTS Radio Access Networks" Computer Communications, Special Issue on 3G Wireless and Beyond for Comp. Communication, June 2002; or a similar algorithm is running in the edge node of the aggregation domain and calculates the required resource units that should be reserved for the traffic flow in the aggregation domain. In this embodiment the edge nodes are routers R-5 and R-9, while routers R-6, R-7 and R-8 are interior routers. The advantage of this method is that a simple reservation is carried out, that is, QoS object is not processed and, advanced algorithm does not have to be run inside the aggregation domain D. In the aggregation domain D usually only aggregated states are stored and maintained, which require less processing capacity. In this case the edge nodes, that are routers R-5 and R-9, are responsible to handle the error in the aggregation domain D. So the RESERVE message is sent along reservation initiator RI-routers R-5-R-6-R-7-R-9—reservation receiver RR. QoS object may be tunneled in the aggregation domain D and used for resource reservation outside the domain D. The tunnel T is established between router R-5 and R-9 performing complex reservation (dashed line). In this embodiment only edge routers R-5 and R-9 have calculating means for interpreting resource reservation objects including source statistics descriptors.

Figure 6:
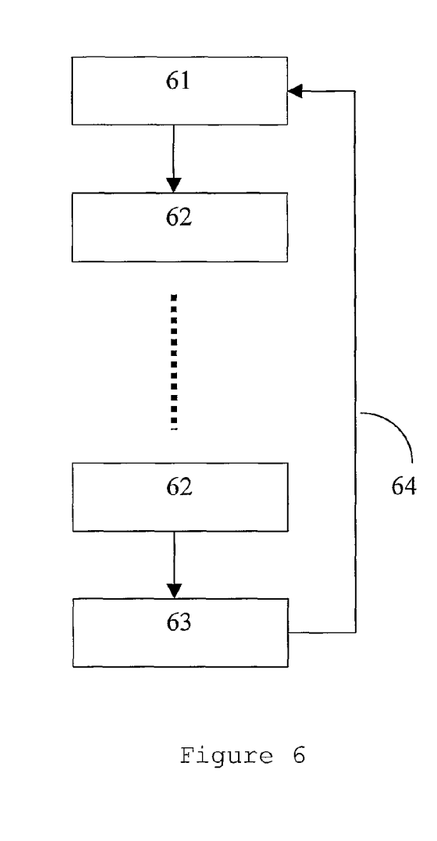
FIG. 6 is a flow chart illustrating the steps of one embodiment of the method of the present invention.

FIG. 6 is a flow chart illustrating the steps of one embodiment of the per flow method the diagram of which is shown in FIG. 4. In the first step 61 we initialize the reservation in the reservation initiator. In step 62 reservation is carried out in the routers along the flow of transmission. When RESERVE message arrives at reservation receiver this message is received in step 63 and an acknowledgement is sent backward in step 64. In this embodiment CAC exploits sub-object of source statistics description in each router along the flow of transmission.

Figure 7:
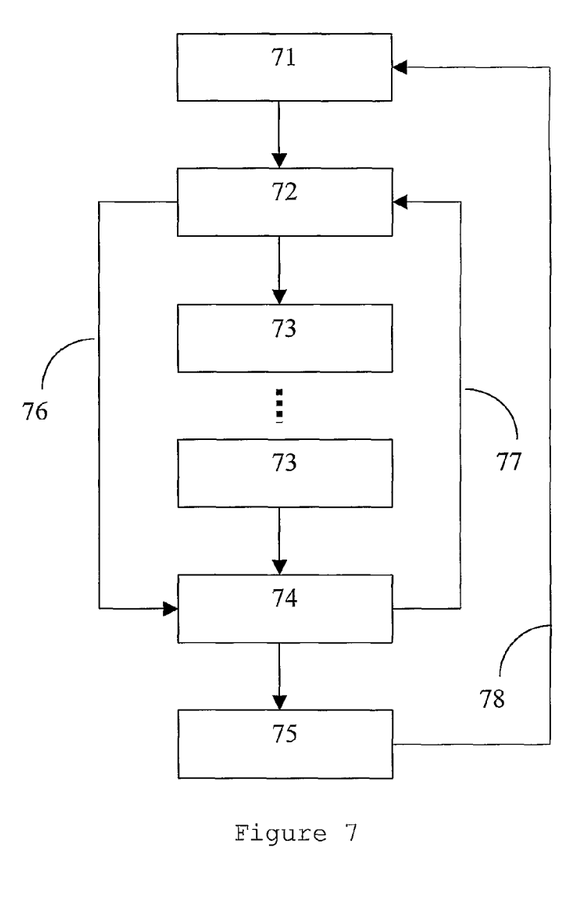
FIG. 7 is a flow chart illustrating the steps of another embodiment of the method of the present invention.

FIG. 7 is a flow chart illustrating the steps of one embodiment of the method of the resource reservation in an aggregation domain the diagram of which is depicted in FIG. 5. In the first step 71 the reservation is initialized similar to the previous case. When RESERVE message arrives at the edge of an aggregation domain complex reservation is carried out in step 72 in an edge router where the message enters into the domain and the sub-object of source statistics description is tunneled through the domain up to an edge router where the message leaves the domain, meanwhile simple reservation takes place in interior routers in steps 73. Edge router where the message leaves the domain also performs complex reservation in step 74 and sends acknowledgement backwards in step 77 to the previous edge router. Finally, reservation receiver receives the message in step 75 and sends an acknowledgement backward to the reservation initiator in step 78. In this embodiment CAC uses sub-object of source statistics description in edge routers of the domain along the flow of transmission.

Although the present invention has been described in detail with reference to only two exemplary embodiments of IP network, those skilled in the art will appreciate that various modifications can be made without departing from the invention. Accordingly, the invention is defined only by the following claims, which are intended to embrace all equivalents thereof.

What is claimed is:

1. A method, in a packet switched telecommunications network having a plurality of nodes, for providing resource reservation between a reservation initiator and a reservation receiver of an ON-OFF like traffic containing ON and OFF periods, comprising the steps of:

defining an object including descriptors of a desired Quality of Service (QoS), packet level traffic parameters characterizing a traffic envelope wherein said traffic envelope represents an upper bound of said ON-OFF traffic, and a sub-object of a description of source statistics for a call admission control wherein said source statistics include distribution type and parameters representing a behavior of said ON-OFF traffic wherein the parameters include a length of the ON periods and wherein the length of the ON periods is the mean time of the ON periods;

initializing reservation for a flow of transmission of the ON-OFF like traffic in the reservation initiator;

reserving resources in the nodes along the flow of transmission with a use of said object wherein the nodes are routers of a Terrestrial Radio Access Network of a Universal Mobile Telecommunications Network (UTRAN);

receiving a reservation message in the reservation receiver; and, sending back an acknowledgement to the reservation initiator.

2. The method of claim 1, wherein the call admission control uses the description of source statistics in each node along the flow of transmission.

3. The method of claim 1, wherein the distribution type includes a length of the ON and/or OFF periods and wherein the distribution type of the length of the ON and/or OFF periods is exponential.

4. The method of claim 1, wherein the parameters includes a length of the OFF periods and wherein the length of the OFF periods is the mean time of the OFF periods.

5. The method of claim 1, wherein said packet switched telecommunications network is an Internet Protocol (IP) based network.

6. The method of claim 1, wherein the call admission control uses said description of source statistics in edge nodes of a resource domain along the flow of transmission.

7. A system for providing resource reservation in a packet switched network including a reservation initiator (RI), a reservation receiver (RR) and a plurality of nodes linked together by transmission channels, in which the resource reservation of an ON-OFF like traffic containing ON and OFF periods is implemented and wherein at least a part of the plurality of nodes comprise:

means for processing descriptors of a desired QoS;

means for processing packet level traffic parameters characterizing traffic envelope wherein said traffic envelope represents an upper bound of said ON-OFF traffic;

means for processing description of source statistics wherein said source statistics include distribution type and parameters representing a behavior of said ON-OFF traffic wherein the parameters include a length of the ON periods and wherein the length of the ON periods is the mean time of the ON periods; and wherein the nodes are routers of a Terrestrial Radio Access Network of a Universal Mobile Telecommunications Network (UTRAN).

8. The system of claim 7, wherein the reservation initiator (RI) is a base station controller and the reservation receiver (RR) is a radio network controller of the packet switched network.

9. The system of claim 7, wherein the reservation initiator (RI) is a radio network controller and the reservation receiver (RR) is a base station controller of the packet switched network.

10. The system of claim 7, wherein the nodes are Internet Protocol (IP) routers of an IP network.

11. A node in a packet switched telecommunication network wherein said node is associated with a resource reservation of an ON-OFF like traffic containing ON and OFF periods in said telecommunication network, said node comprising sub-objects of descriptors of a desired QoS;

packet level traffic parameters characterizing a traffic envelope representing an upper bound of said ON-OFF traffic;

a description of source statistics including distribution type and parameters representing a behavior of said ON-OFF traffic wherein the parameters include a length of the ON periods and wherein the length of the ON periods is the mean time of the ON periods; and wherein said node is a router of a Terrestrial Radio Access Network of a Universal Mobile Telecommunications Network (UTRAN).

12. The node of claim 11 wherein the distribution type includes a length of the ON and/or OFF periods and wherein the distribution type of the length of said ON and/or OFF periods is exponential.

13. The node of claim 11 wherein the parameters include a length of the OFF periods and wherein the length of the OFF periods is the mean time of the OFF periods.

* * * * *